(12) United States Patent
O'Donnell (10) Patent No.: US 11,414,186 B2
(45) Date of Patent: Aug. 16, 2022

(54) UNMANNED AERIAL VEHICLE WITH A CONTAINER HAVING A STABILIZING SYSTEM

(71) Applicant: Arin O'Donnell, Spring Hill, FL (US)

(72) Inventor: Arin O'Donnell, Spring Hill, FL (US)

(*) Notice: Subject to any disclaimer, the term of this patent is extended or adjusted under 35 U.S.C. 154(b) by 1124 days.

(21) Appl. No.: 15/926,046

(22) Filed: Mar. 20, 2018

(65) Prior Publication Data
US 2019/0291865 A1  Sep. 26, 2019

(51) Int. Cl.
| | | |
|---|---|---|
| *B65D 81/02* | (2006.01) | |
| *B64C 39/02* | (2006.01) | |
| *B65D 81/05* | (2006.01) | |
| *B65D 81/38* | (2006.01) | |
| *B65D 25/10* | (2006.01) | |

(52) U.S. Cl.
CPC .......... *B64C 39/024* (2013.01); *B65D 25/101* (2013.01); *B65D 81/052* (2013.01); *B65D 81/3818* (2013.01); *B64C 2201/027* (2013.01); *B64C 2201/128* (2013.01)

(58) Field of Classification Search
CPC ................ B65D 25/101; B65D 81/052; B65D 81/022; B65D 81/3818
USPC ...................... 206/521, 522, 591–594; 383/3
See application file for complete search history.

(56) References Cited

U.S. PATENT DOCUMENTS

| | | | | |
|---|---|---|---|---|
| 3,733,005 A | * | 5/1973 | Frieder, Jr. ......... | B65D 90/0046 206/522 |
| 3,889,743 A | * | 6/1975 | Presnick ............ | B65D 81/3858 62/529 |
| 5,240,135 A | * | 8/1993 | Lepinoy .............. | A61F 5/05833 220/23.91 |
| 5,769,232 A | * | 6/1998 | Cash .................... | B65D 81/052 383/3 |
| 10,137,986 B1 | * | 11/2018 | Bar-Zeev ................. | B64D 1/14 |
| 2008/0219602 A1 | * | 9/2008 | Arvidsson ............. | F16N 31/004 383/3 |

* cited by examiner

*Primary Examiner* — Luan K Bui
(74) *Attorney, Agent, or Firm* — Tiffany C. Miller (57) ABSTRACT

An unmanned aerial vehicle is removably connected to a container. The container has a vessel retaining a pressurized gas supply and a manifold having a plurality of ports connected to a plurality of expandable structures. The pressurized gas supply is in communication with a plurality of expandable structures. The container also has least one compartment having a plurality of expandable structures configured to capture a payload. Additional improvements include an improved docking structure for the unmanned aerial vehicle to engage a container and a rotatable weight distribution system for maintaining a center of gravity at the physical center of gravity of the unmanned aerial vehicle.

33 Claims, 8 Drawing Sheets

FIG. 9

UNMANNED AERIAL VEHICLE WITH A CONTAINER HAVING A STABILIZING SYSTEM

BACKGROUND OF THE INVENTION

1. Field of the Invention

This invention relates, generally, to an unmanned aerial vehicle having a storage container. More particularly, it relates to a storage container having a compartment with a plurality of expandable structures configured to contour the outer perimeter of an object retained within the compartment.

2. Background Art

Delivery methods in today's market include vehicles transferring goods from one point to another. Packages have been known to be delivered by vehicles such as, airplanes, bicycles, trucks, cars, or ships. These vehicles require the need of a human pilot or a human driver on board. The costs associated with a human pilot on board can be costly. It is more desirable to eliminate the need for a human pilot on board. Further, in a busy city, heavy traffic may take delivery vehicles hours to deliver the item to a destination. Thus, there is a need for a delivery system having an unmanned aerial vehicle capable of delivering items that does not require the use of roads.

In another example, destinations located in more difficult to reach areas such as islands in the Florida Keys or mountains in the Carolinas may not be accessible easily by vehicle. Water barriers are a common obstacle for on-road delivery. Often times a vehicle is required to drive over bridges or be transported with a barge. This makes deliveries more challenging. In another example, natural disasters may result in debris blocking the roads, which in turn prevents cars and trucks from accessing areas in need of supplies. Thus, there is a need for a delivery method using an unmanned aerial vehicle such as a drone having a container that is capable of delivering items to any location.

Currently, the market for food delivery services is in high demand. Many restaurants and grocery stores offer the convenience of food pick up or delivery. In an example, the delivery process of food, such as pizza deliveries, fast food delivery, to-go orders, or a pre-prepared meal, starts with the meal being packaged. Often the meal is placed in various sized containers each having a lid. The container with the lid may then be placed in a box, a plastic bag, or a paper bag to keep the food secured together. However, the packages of prepared food still manage to slide around during delivery. There is a long felt, yet unfulfilled need to stabilize the contents of a package which results in minimizing damage to the contents of the package.

Packaged food is often times transported to a desired location inside of a car, truck, or on a bicycle. During that transport, the food may tip over or may slide around, resulting in leakage of the food product from the packaging or potential staining and damage to the interior of the vehicle from the spill. However, it would be more desirable for the contents of a package to be better secured during transportation in an attempt to eliminate damage or spillage of the item, to eliminate damage associated with spills to the transportation vessel during transport, and to eliminate damage of an item associated with the impact of the unsecured contents sliding around the transportation vessel. Thus, there is a need for an unmanned aerial vehicle having a container with a stabilizing system capable of capturing its contents during transportation.

Further, a boxed pizza may be placed in an insulated container during transport to the desired location. The food contents may lose their heated temperature during the delivery process. It is more desirable for some deliveries to maintain a preferred temperature while being transported to the destination. Thus, there is a need for an unmanned aerial vehicle having an insulated container.

It is standard procedure to stabilize boxes and packaging with external securing means such as a net, tape, a cord, or a rope. Additionally, it is known to internally secure contents of a package with filling material such as cardboard blocks, foam pellets, or plastic air packets. The problem with these current stabilization techniques it that it requires the external securing means and the internal filling material. Subsequently, this can be costly, wasteful to the environment, labor intensive, time consuming, heavy in weight, and subject to human error. What is therefore needed is a method of the unmanned aerial vehicle to securely connect to the exterior of the container, whereby, the container has expandable structures which secure the payload located in the interior of the container. This eliminates the excessive materials and the human labor involved during the loading and packaging process.

Weight is a primary concern when operating a drone. Weight limit restrictions need to be acknowledged before each flight. In the context of an unmanned aerial vehicle being substantially light in weight and being connected to a container with meal contents of total weight relatively approximate to the weight of unmanned aerial vehicle, the importance of establishing a safe center of gravity is heightened. Further, the fact that the delivery contents itself can be unevenly distributed such as the relative positioning of heavier liquids in relation to lighter weight solids provides weight distribution challenges. It is more desirable for the weight of the drone and the container being transported by the drone to be as light weight as possible. Therefore, there is a need to eliminate the loose external securing devices and to eliminate the need for filling material in an attempt to lessen the weight load. Thus, it is more desirable for a container being transported by a drone having a stabilizing system that is both light weight and integrally formed. What is therefore needed is a means of the unmanned aerial vehicle to removably connect to a container, thereby, eliminating the need for additional external securing means.

Aircrafts and unmanned aerial vehicles in today's market utilize various mechanisms to account for weight distribution. These mechanisms often require the rotors to compensate for uneven weight distribution which results in quicker wear on the drone parts, increases pilot error rates, and contributes to rapid battery depletion. There is a need for an unmanned aerial vehicle capable of maintaining a center of gravity that is at the true physical center of gravity of the unmanned aerial vehicle upon initiation of flight and throughout flight. When the center of gravity is at the true center of the unmanned aerial vehicle downward rotor thrusts, the result is a reduction of unmanned aerial vehicle rotors to compensate for uneven weight distribution. The potential for thrust failure is present with all unmanned aerial vehicles that rely upon multiple propellers. Additionally, the failure of one or more propellers would result in an uneven flight that would likely lead to a failed flight. The ability for an unmanned aerial vehicle to compensate by shifting an onboard weight could safely mitigate an inherently unsafe flight situation and compliment the ability of an unmanned aerial vehicle to use variable rotor thrusting to compensate.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for an unmanned aerial vehicle having a container, thereby limiting the number of elements required during delivery of the container to a destination, and which also includes improvements that overcome the limitations of prior art unmanned aerial vehicles is now met by a new, useful, and non-obvious invention.

In one embodiment an unmanned aerial vehicle includes a novel container. In a second embodiment, a novel container is presented. Although it is a preferred embodiment for the novel container to removably connect to an unmanned aerial vehicle, the novel container is not required to connect to an unmanned aerial vehicle. The container has at least one compartment. The compartment is configured to conform to at least a portion of a payload. The compartment has a payload. The container is removable from the unmanned aerial vehicle. At least one compartment of the container has a plurality of expandable structures. At least one of the plurality of expandable structures capture at least a portion of the payload. The payload can be captured by an expandable structure from direct contact with an end portion of an expandable structure from direct contact with a side wall of an adjacent expandable structure. The payload is retained within the compartment from top, bottom, side capturing means, or end and side portions in relation to the expandable structures. The expandable structure does not have to be fully extended to capture the payload. As long as there is contact between at least a portion of the expandable structure and the payload, the payload will be secured in place from the force of the pressurized gas within the expandable structure acting upon the payload.

The container has a vessel. The vessel retains a pressurized gas supply. The vessel can be mounted onto a surface of the container. The vessel can alternatively be integrally formed within the container. In an alternate embodiment, the vessel can be separate from the container, in which, a hose connects an external pressurized vessel to the primary valve of the container. A plurality of expandable structures are in communication with the pressurized gas supply. A first valve is positioned in an open configuration to transfer at least a portion of the pressurized gas supply from the vessel to the plurality of expandable structures, thereby, orienting at least a portion of the plurality of expandable structures in an extended position. A second valve is positioned in an open configuration to discharge at least a portion of the pressurized gas supply from the plurality of expandable structures, thereby, orienting the plurality of expandable structures in a retracted position.

The unmanned aerial vehicle can have a container having a manifold. The manifold can have a plurality of ports connected to the plurality of expandable structures. The first valve has a first opening having a boarder located on the outer perimeter edge of said first opening located opposite a second opening having a boarder located on the outer perimeter edge of said second opening. The boarder of the first opening of the first valve is connected to the vessel. The second opening of the first valve is pneumatically connected to the manifold. The second valve has a first opening located opposite a second opening. The first opening of the second valve is open to the atmosphere. The boarder of the second opening of the second valve is pneumatically connected to the manifold.

In an alternate embodiment, the plurality of expandable structures each have a resilient member including, but not limited to, a spring. The spring is configured to bias the plurality of expandable structures when the plurality of expandable structures are oriented in an extended position.

In another embodiment, the novel container has a docking structure. The docking structure is configured to communicate with at least a portion of the unmanned aerial vehicle. At least a portion of an unmanned aerial vehicle connects with at least a portion of a docking structure of the container. The docking structure can have a first flange having a first recess located opposite a second flange having a second recess. The first recess and the second recess are configured to engage at least a portion of the unmanned aerial vehicle.

In another embodiment, the docking structure of the container can have a rod. The rod has a first end located opposite a second end. The first end of the rod is connected to the docking structure of the container. The second end of the rod is connected to a weight. The first end of the rod can rotate around the perimeter of the docking structure 360 degrees. The rod can be telescoping. It is within the scope of this invention for the term telescoping to mean that the rod can expand in length or retract in length. The weight can slidably traverse at least a portion of the length of the rod. In an alternate embodiment, any portion of the rod can connect to the docking structure of the container. Each end of the rod can have a weight connected thereto.

In an alternate embodiment, the docking structure of the container can have a rod having a first end located opposite end. The rod is rotatably connected to the docking structure of the container. The second end of the rod is connected to a weight. The first end of the rod may alternatively be connected to another weight. It is within the scope of this invention for the rod to have a length great enough to extend beyond the outer perimeter edge of the container. The second end of the rod protrudes from an outer perimeter edge of the container.

In an alternate embodiment, the container can have a rod. The rod has a first end located opposite a second end. The first end of the rod is rotatably connected to the container. The second end of the rod protrudes from an outer perimeter edge of the container. The second end of the rod is connected to a weight.

The vessel retains a pressurized gas. The vessel can include, but is not limited to, a tank or a bottle. A vessel has a very high pressure. A vessel can have a pressure regulator to step the pressure down when in use. The pressure regulator takes a higher pressure and restricts it to a lower pressure to not damage the expandable structures when in use.

In an alternate embodiment, the novel unmanned aerial vehicle can have a removable container. The removable container can have at least one compartment. The compartment can be configured to conform to at least a portion of a payload. The compartment can also have a payload and the compartment can conform to at least a portion of the payload. At least one compartment of the container has a plurality of expandable structures. The plurality of expandable structures are configured to capture at least a portion of the payload. Also, the plurality of expandable structures capture at least a portion of the payload.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
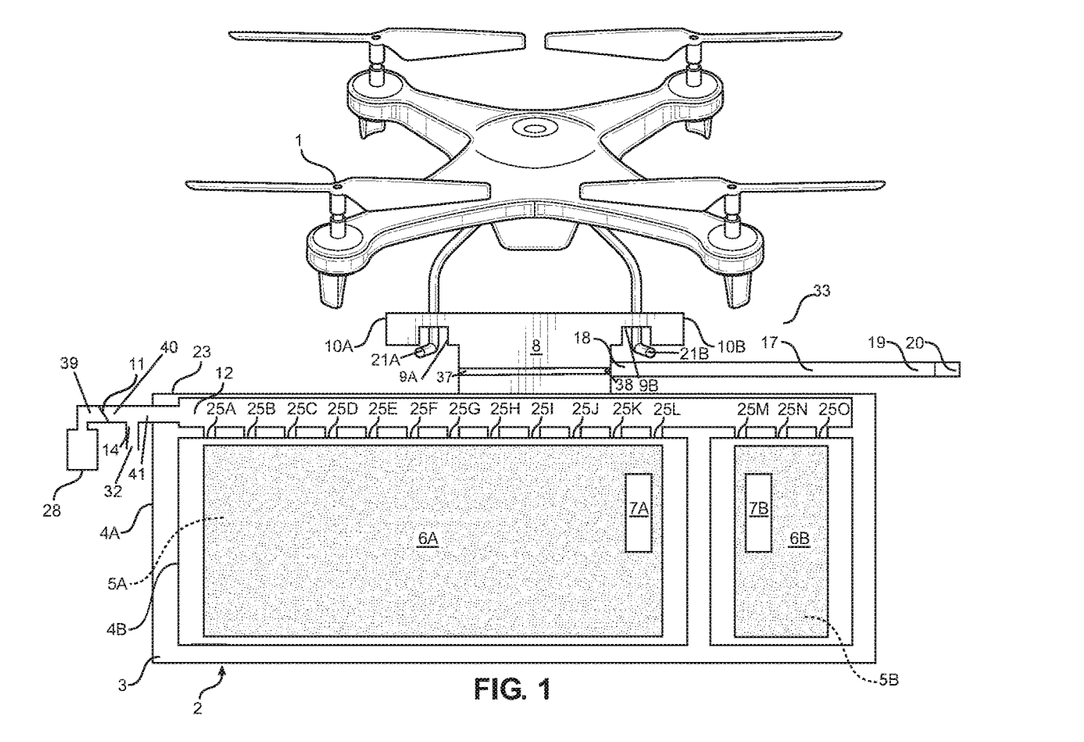
FIG. 1 is a side cut-away view of the novel unmanned aerial vehicle connected to the docking structure of a container with the doors of the container in a closed position.
Figure 2:
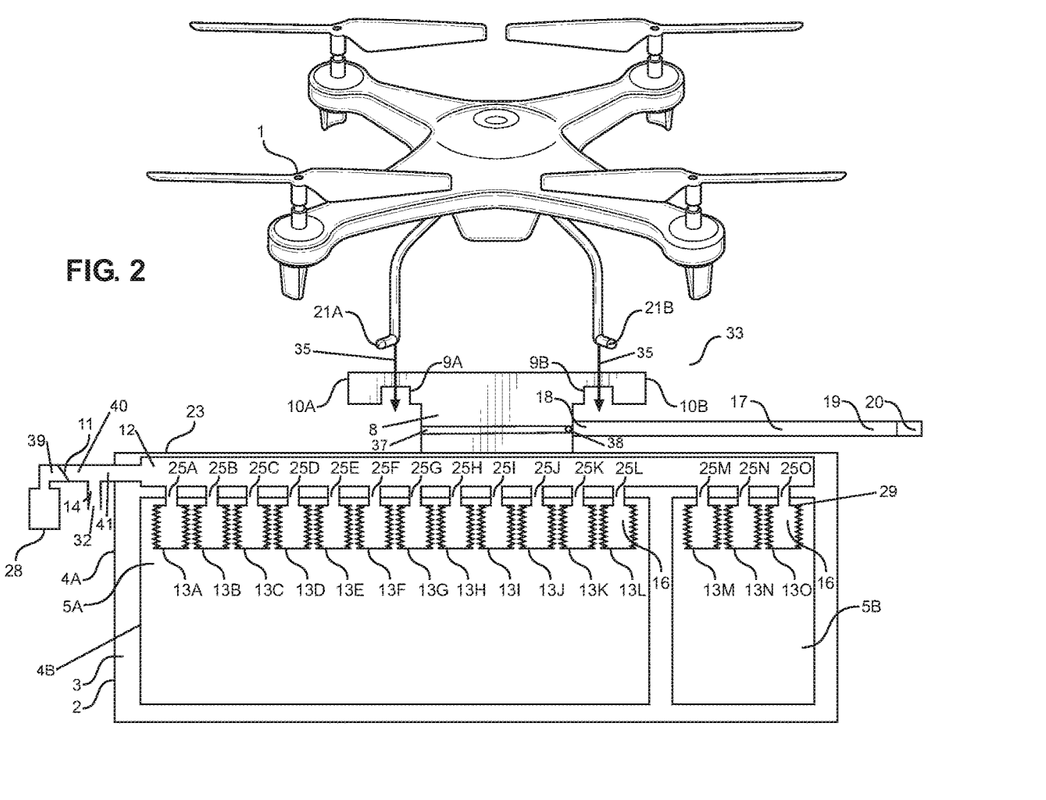
FIG. 2 is a side cut-away view of the novel unmanned aerial vehicle aligned with the docking structure of a container with a manifold having a plurality of ports connected to a plurality of expandable structures oriented in a retracted position when valve 11 is closed and valve 14 is opened.
Figure 3:
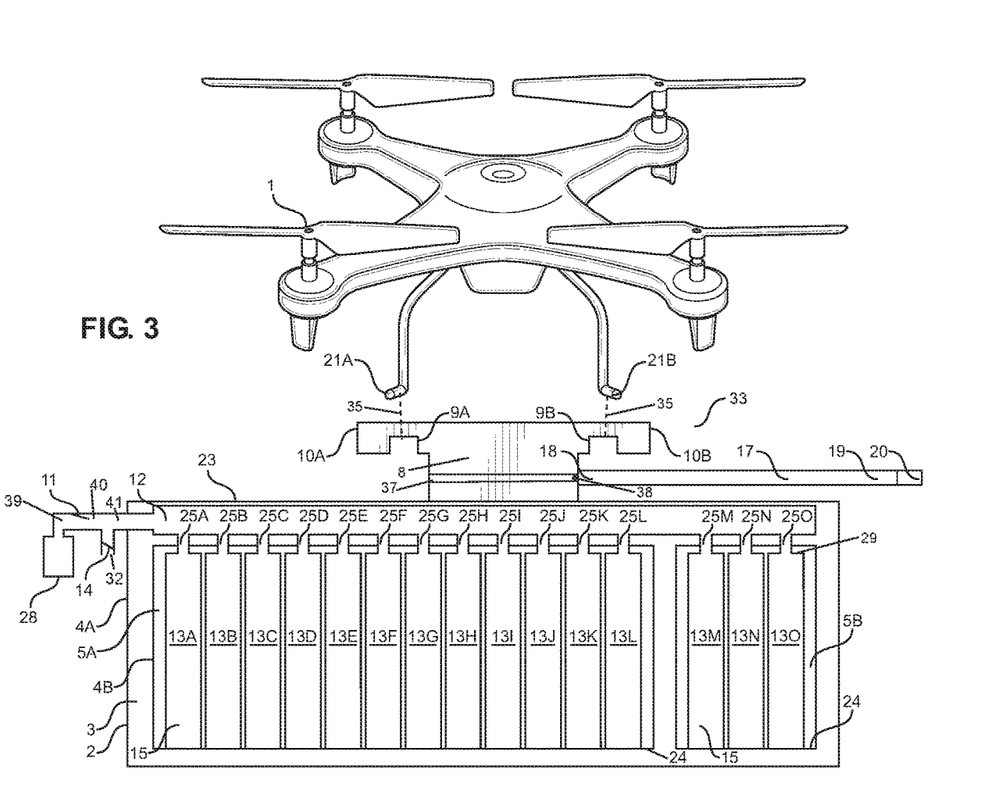
FIG. 3 is a side cut-away view of the novel unmanned aerial vehicle aligned with the docking structure of a container with a manifold having a plurality of ports connected to a plurality of expandable structures oriented in an expanded position when valve 11 is opened and valve 14 is closed.
Figure 4:
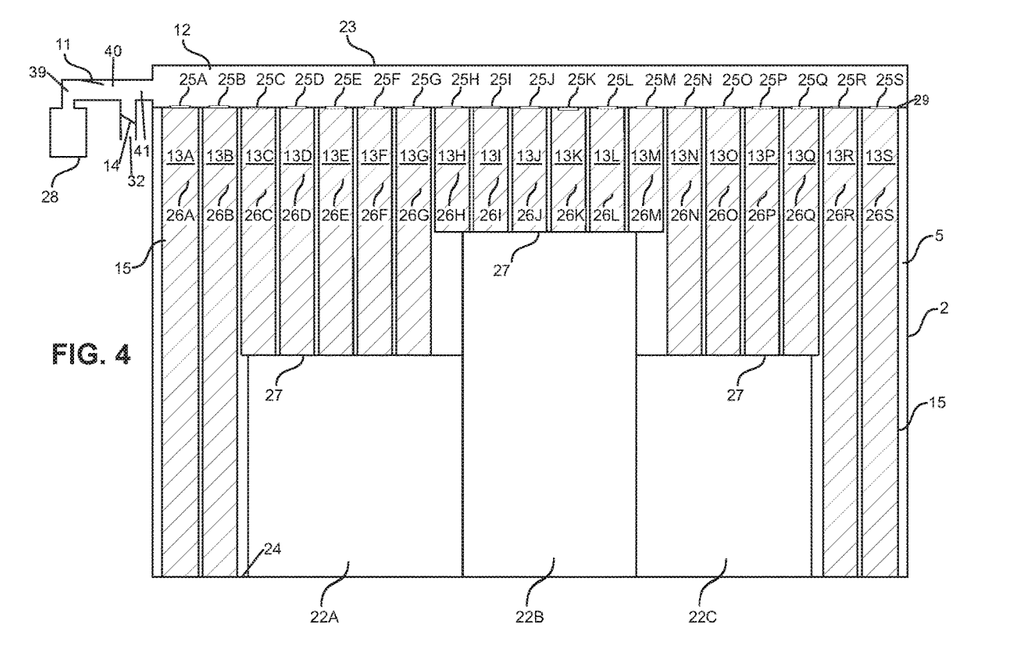
FIG. 4 is a side cut away view of the novel container having a compartment with a payload being secured by a plurality of expandable structures, each having a spring, the plurality of expandable structures are oriented in an expanded position when valve 11 is opened and valve 14 is closed.

In a general embodiment, the novel unmanned aerial vehicle 1 includes container 2. It is within the scope of this invention for an unmanned aerial vehicle 1 to include but not be limited to, any aircraft piloted by remote control or onboard computers, such as a drone. FIG. 4 best illustrates container 2 having a single compartment 5. FIGS. 1-3 best illustrate container 2 having a plurality of compartments 5A and 5B.

In another embodiment, compartment 5A can be accessed when door 6A is opened. Door 6A can have handle 7A. Compartment 5B can be accessed when door 6B is opened. Door 6B can have handle 7B. Door 6 may be configured in any way including, but not limited to, hinged or slidably traversable. Door 6A is configured to open for access to load and unload payload 22 (not shown) from compartment 5A of container 2. Door 6B is configured to open for access to load and unload payload 22 (not shown) from compartment 5B of container 2. Door 6 can have a sealing structure (not shown) to maximize insulation and protection of payload 22 from weather. It is within the scope of this invention for container 2 to have any amount of compartments 5. It is also within the scope of this invention for compartment 5 to be positioned in any orientation within container 2. For example, compartment 5A does not need to be horizontally adjacent to compartment 5B. In another example, the compartments 5 could be vertically oriented (not shown) or stacked one compartment 5A on top of the other compartment 5B.

In a preferred embodiment, container 2 can be insulated 3. It is within the scope of this invention for container 2 to be made of any material including, but not limited to, a light weight material, a durable material, or a material capable of insulating compartment 5. It is within the scope of this invention for the payload 22 to include, but not be limited to, the contents of container 2, such as food, beverage, or non-food item. In an alternate embodiment, container 2 has double wall insulation 3 surrounding compartments 5. Container 2 has an insulated portion 3 formed from a vacuumed area between first wall 4A and second wall 4B. This vacuumed area 3 adds no additional weight and reduces heat conduction and convection. It is envisioned that any insulation means can be incorporated into the structure of novel container 2.

In another embodiment, container 2 can have at least one compartment 5 or a plurality of compartments 5. It is within the scope of this invention for container 2 to have any shape. It is a preferred embodiment for the shape of container 2 to include, but not be limited to, a shape that reduces drag or a shape that is airfoil in design to help with lift during horizontal flight, which as a result may extend the range of unmanned aerial vehicle 1.

In another embodiment, docking structure 8 is connected to container 2. Docking structure 8 can be removable or fixed to container 2 or to unmanned aerial vehicle 1. It is within the scope of this invention for unmanned aerial vehicle 1 to securely dock and attach to container 2. The unmanned aerial vehicle 1 needs to be able to retain and lift container 2 into the air during delivery. Docking structure 8 can have slots, openings, or recesses 9A and 9B capable of receiving at least a portion of unmanned aerial vehicle 1. Unmanned aerial vehicle 1 can have protruding structures 21A and 21B that are received by recesses 9A and 9B respectively of docking structure 8. Unmanned aerial vehicle 1 can have a single protruding structure 21 or a plurality of protruding structures 21A and 21B that are capable of connecting the unmanned aerial vehicle 1 to docking structure 8 of container 2. In a preferred embodiment, protruding structures 21A and 21B connect to container 2 from under the flanges 10A and 10B of docking structure 8. It is envisioned that unmanned aerial vehicle 1 controls movement of protruding structures 21 of unmanned aerial vehicle 1 during the docking process. Unmanned aerial vehicle 1 is capable of releasing container 2 from protruding structures 21 upon delivery.

In yet another embodiment, novel container 2 has a slotted compartment located anywhere on or in container 2 to allow for a magnetic or similar technology that can be updated and electronically read with respect to data. It is within the scope of this invention for data to include, but not be limited to, a name, an address, GPS coordinates, payload type, or content information.

In another embodiment, a pressurized vessel 28 retains a pressurized gas supply. Primary valve 11 has a first end having an opening connected to pressurized vessel 28 located opposite a second end having an opening pneumatically connected to manifold 12. Manifold 12 has a plurality of ports 25 each connected to an expandable structure 13. It is within the scope of this instant invention for expandable structure 13 to be an inflatable tube or an inflatable pouch that conforms to payload 22 when payload 22 is placed into compartment 5 of container 2. A plurality of expandable structures 13 is the preferred embodiment in this invention. In an example, when primary valve 11 is opened, pressurized gas supply is transferred from vessel 28 to expandable structures 13, causing expandable structures 13 to inflate 15 until met by resistance. The resistance can include, but not limited to, the delivery contents, payload 22, or an inner wall surface 24 of compartment 5. Once the desired air pressure is reached, primary valve 11 is oriented in a closed position. A secondary valve has an end having an opening open to the atmosphere located opposite an end having an opening in pneumatic communication with manifold 12. When secondary valve 14 is oriented in an open position, pressurized gas is vented from expandable structures 13 to atmosphere 45. Expandable structures 13 rapidly retract 16 or spring back to the top portion of delivery container 2 to allow for easy access and removal of the contents 22.

When plurality of expandable structures 13 are expanded 15 delivery contents 22 are secured in place 27 by the force of expandable structures 13 being applied to delivery contents 22. When delivery contents 22 are secured in place 27, they cannot move or slide around within compartment 5 of container 2 during flight. In an example, even an improperly or unevenly loaded payload 22 can be retained by the force of expandable structures 13 being applied to payload 22 and can be retained by the expandable structures 13 located adjacent to or next to payload 22 as well. Expandable structure 13 acts as a barrier. The barrier prevents payload 22 from shifting or sliding when expandable structure 13 is positioned including but not limited to, on top of, on bottom of, next to, juxtaposed to, or adjacent to payload 22. Fixation by air pressurization can achieved using primary valve 11 located at an outer surface of container 2.

It is within the scope of this invention for pressurized air bags or pouches to be configured to fill the empty space around delivery contents 22.

Expandable structure 13 can be embedded with a lightweight spring 16.

Primary valve 11 is located on the exterior surface of container 2. In a preferred embodiment, primary valve 11 is placed on the top or side surface 23 of container 2 to maximize airspace within manifold 12. Although the preferred embodiment teaches primary valve 11 can positioned in a location that is oriented at the top or side surface 23 of container 2, it is within the scope of this invention for primary valve 11 to be located anywhere on or in container 2. Manifold 12 has a plurality of evenly or unevenly spaced ports 25. These ports 25 are in communication with compartment 5. In particular, end portion 29 of expandable structure 13 is connected to port 25.

In an alternate embodiment, ports 25 are spaced along the x-axis and y-axis of manifold 12. It is within the scope of this current invention for ports 25 to be permanently opened or closed by the use of small solenoids.

It is also within the scope of this invention for vessel 28 to be capable of retaining a pressurized gas supply. Pressurized gas includes, but is not limited to, any gas, nitrogen, helium, or air. It is within the scope of this invention for the vessel 28 to be integrally formed within container 2. It is within the scope of this invention for each of the valves to be oriented in a closed position or in a closed position by electronic signals. A small pump can be connected to primary valve 11 to ensure constant pressurization. A fill valve 11 allows the actuators to fill with pressurized gas and expand 15. A deflate valve 12 lets the gas leak out of the actuators, allowing the actuators to retract 16. The actuators include, but are not limited to air tubes or expandable structures 13.

Unmanned aerial vehicle 1 is connected to container 2 having an adjustable center of gravity mechanism 33 including rod 17 having primary end 18 located opposite secondary end 19. Rod 17 can be fixed in length or telescoping. A telescoping rod 17 is more desirable because it creates the least amount of drag. Rod 17 can be a length great enough to rotate 360 degrees above container 2. In an embodiment, rod 17 is configured to be locked at a predetermined position. In another embodiment, rod 17 can auto retract when compartment 5 of container 2 is empty. It is a preferred embodiment for rod 17 to have a length extending beyond the outer portion of the unmanned aerial vehicle 1.

Rod 17 is capable of the placement of a fixed weight at any point along the x-axis or y-axis of the horizontal plane located above container 2. It is within the scope of this current invention for rod 17 to have a fixed weight 20 or weights of differing sizes. A plurality of weights 20 are connected to rod 17 as rod 17 expands and retracts. Weight 20 can be made of any material including, but not limited to, lead. It is also within the scope of this invention for rod 17 to have weight 20 slidably traversing at least a portion of the length of rod 17. Rod 17 is capable of establishing a center of gravity at the true physical center of container 2 and unmanned aerial vehicle 1. It is within the scope of this invention for rod 17 to be connected to unmanned aerial vehicle 1, to container 2, or to docking structure 8 of container 2.

In one embodiment, an enclosed fixed weight metal plate can be positioned along a two dimensional axis (X,Y) along an arm with sufficient space in the enclosed space to give it the ability for achieving a safe center of gravity for flight. This mechanism will be optimized in terms of dimensions and weight for the likely range of delivery profiles. Although weight 20 can be positioned prior to flight takeoff, the position of weight 20 can be controlled by unmanned aerial vehicle 1 during flight such as, hydraulically, electrically, or mechanically. Both the movement of the arm 17 and the fixed weight 20 can be used during flight to re-position to maintain safe flight as needed if payload 22 shifts due to loss of air pressurization or thrust issues with the rotors of unmanned aerial vehicle 1. Leveling meters along two axes would be used to provide feedback to the unmanned aerial vehicle's onboard computer, which could then adjust the position of the movable, fixed weight to compensate. While functional dimension limitations exist, the greater and the more variable the movement of the plate allowed, the lesser the weight would be needed to achieve a safe flight center of gravity.

A feature capable of being applied to all embodiments is a weighted plate capable of being positioned along an arm by four actuating arms that push the weighted plate to the desired location and are able to hold the weighted plate at that point as needed. Such actuating arms can be moved by any mechanical means, hydraulic, or electrically controlled nylon with teeth. The actuating arms can also be used during flight to reposition the weight to maintain safe flight as needed.

In another embodiment, an enclosed fixed weight metal object can be positioned along a singular axis inside a linear object, which itself can rotate a full 360 degrees and gives unmanned aerial vehicle 1 the ability to achieve a safe center of gravity for flight. The weight positioned linearly, coupled with an enclosed arm configured to rotate 360 degrees, allows for the maximum ability to achieve a holistic center of gravity for the entire object. In this embodiment, the least amount of weight as can be extended beyond the dimensions of delivery container 2. A hollow arm 17 can have weight 20 located within hollow arm 17. Weight 20 can be positioned anywhere within hollow arm 17. Hollow arm 17 can be rotated 360 degrees. Hollow arm 17 could be an outside profile of a symmetrical airfoil that minimizes drag and creates no positive or negative lift so as not to factor in the unmanned aerial vehicles rotor driving flight. Hollow arm 17 can rotate 360 degrees above unmanned aerial vehicle 1. In an example, with countless individuals loading delivery containers with a variety of contents, the containers will not have a center of gravity at its true center of gravity. The use of leverage in that the farther a telescoping arm can extend above the container, the less weight can be used to achieve the desired center of gravity.

Construction of the Novel Unmanned Aerial Vehicle Having a Container

FIGS. 1-3 illustrate unmanned aerial vehicle 1 having protruding structures 21A and 21B. Protruding structures 21 connect to docking structure 8. In particular, docking structure 8 has first flange 10A with first recess 9A located opposite second flange 10B with second recess 9B. Protruding structures 21A and 21B of unmanned aerial vehicle 1 are retained by recess 9A and 9B respectively. FIGS. 2-3 illustrate protruding structures 21A and 21B are aligned 35 with recess 9A and 9B respectively, just prior to being engaged by or connecting to recesses 9A and 9B. Adjustable center of gravity mechanism 33 has axis of rotation 30 (FIG. 8) of rod 17 positioned at the location of docking structure 8. Docking structure 8 is connected to rod 17. Rod 17 has primary end 18 located opposite secondary end 19. Rod 17 can be rotatably connected to docking structure 8. Primary end 18 of rod 17 can be connected to a track bearing including, but not limited to, a roller bearing or a ball bearing 38. Docking structure 8 has ball bearing 38 retained within track 37. Ball bearing 38 can slidably traverse track 37 of docking structure 8. Once in a desired position, rod 17 can be locked in place either manually or electronically. In an example, a locking mechanism would prevent the ball bearing 38 from sliding in track 37 when rod 17 is in a desired position. Weight 20 is connected to rod 17. Weight 20 can be removable from rod 17. Additional weight 20 may be added or removed from rod 17. Weight 20 can slidably traverse track 42 (FIG. 8) located on at least a portion of the length of rod 17. Docking structure 8 is connected to container 2.

FIGS. 1-3 depict container 2 having insulated portion 3 with first wall 4A and second wall 4B. Container 2 has insulated portion 3 formed between first wall 4A and second wall 4B. Container 2 has compartment 5A and compartment 5B. Container 2 has an outer wall surface 23. FIG. 1 best illustrates container 2 having compartment 5A having door 6A. Door 6A can have handle 7A. Compartment 5B has door 6B. Door 6B can have handle 7B. Door 6A is configured to open for access to load and unload payload 22 (FIG. 4) from compartment 5A of container 2. Door 6B is configured to open for access to load and unload payload 22 (not shown) from compartment 5B of container 2.

FIGS. 1-4 illustrate vessel 28 retaining pressurized gas (not shown). Primary valve 11 has a first opening 39 connected to pressurized vessel 28 located opposite a second opening 40 pneumatically connected 31 (FIG. 9) to manifold 12. Manifold 12 has a plurality of ports 25A-25O each connected to plurality of expandable structure 13A-13O respectively (FIGS. 2-3). Secondary valve 14 has first opening 32 that is open to the atmosphere 45 (FIG. 9) located opposite a second opening 41 in pneumatic communication 31 (FIG. 9) with manifold 12. It is within the scope of this current invention for a valve to be any type of valve capable of opening and closing a passage to stop, increase, or decrease flow of a pressurized gas including, but not be limited to, a gate valve.

Figure 9:
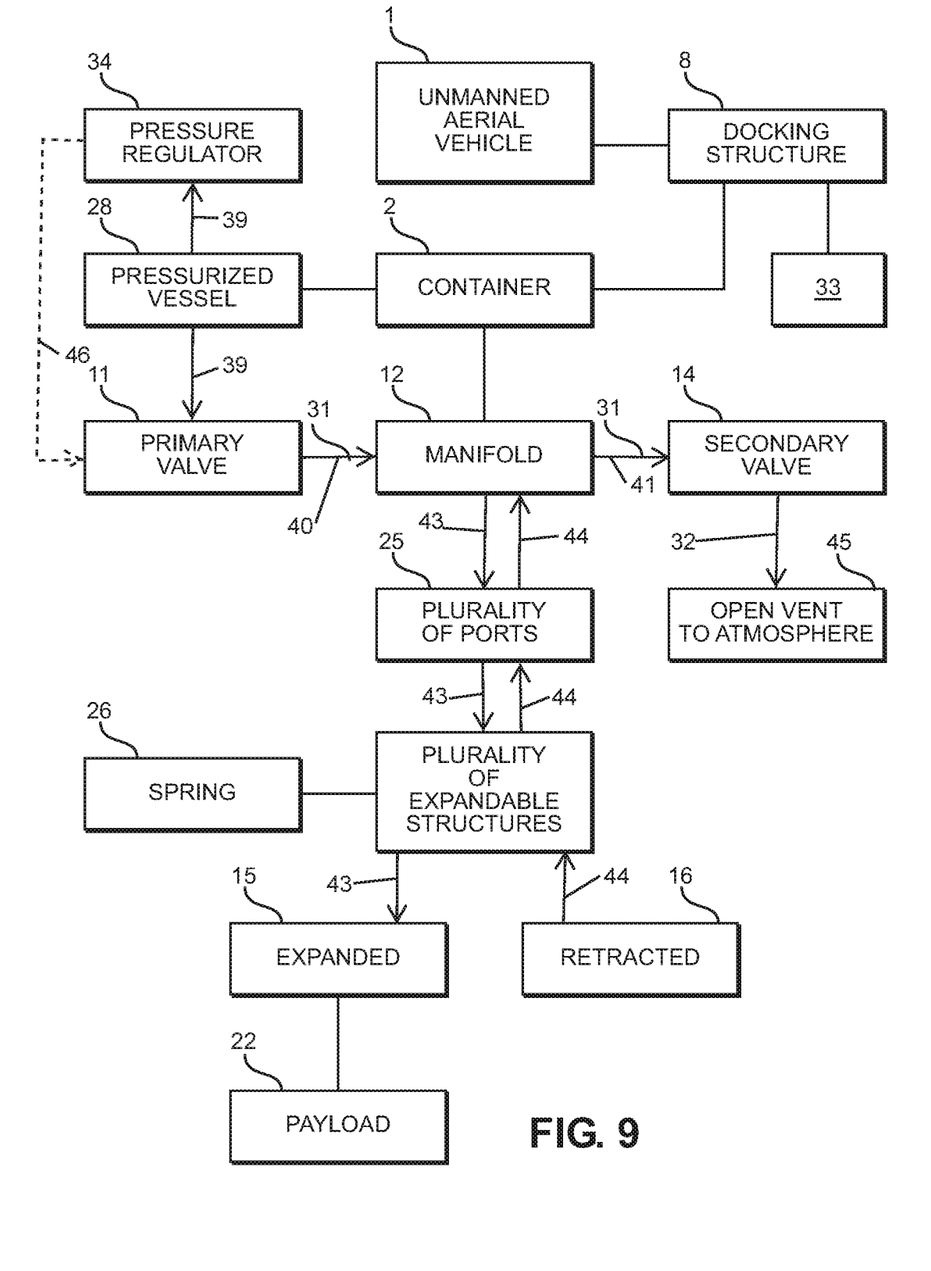

FIGS. 1 and 2 illustrate primary valve 11 positioned in a closed position and secondary valve 14 in an open position. When primary valve 11 is closed, pressurized gas cannot flow from vessel 28 to manifold 12. When secondary valve 14 is opened, pressurized gas escapes or is exerted from at least one expandable structure 13. In an example best shown in FIG. 2, when pressurized gas is exerted from 44 (FIG. 9) plurality of expandable structures 13A-13O, the pressurized gas flows 44 (FIG. 9) through plurality of ports 25 of manifold 12, flows through second opening 41 of second valve 14, flows through first opening 32 of secondary valve 14, and finally is vented to the atmosphere 45 (FIG. 9). When the pressurized gas is vented to the atmosphere 45 (FIG. 9), plurality of expandable structures 13A-13O retract 16. When the plurality of expandable structures 13A-13O retract 16 they are positioned away from the central portion of container 2 to provide ample space for loading and unloading of payload 22 (FIG. 4). It is within the scope of this current invention for plurality of expandable structures 13A-13O to retract 16 to any inner wall of container 2 including, but not limited, the top wall (FIG. 2), bottom wall (not shown), side wall (not shown), or door surface (not shown).

FIG. 2 depicts plurality of expandable structures 13A-13O each connected to ports 25A-25O respectively. Primary valve 11 is oriented in a closed position and secondary valve 14 is oriented in an open configuration. When secondary valve 14 is oriented in an open position, pressurized gas (not shown) is vented from first opening 32 of secondary valve 14 from at least one of or a plurality of expandable structures 13A-13O to the atmosphere 45 (FIG. 9). At least one of or a plurality of expandable structures 13A-13O retract 16 or spring back to the top portion of delivery container 2.

FIG. 3 shows secondary valve 14 is closed and pressurized gas cannot flow from expandable structure 13 to atmosphere. Primary valve 11 is opened, pressurized gas from vessel 28 flows through first opening 39 of primary valve 11, flows through second opening 40 of primary valve 11, flows through 43 plurality of ports 25 of manifold 12 to plurality of expandable structures 13A-13O, causing plurality of expandable structures 13A-13O to inflate 15 until met by resistance. In FIG. 3, the resistance is inner wall surface 24 of compartments 5A and 5B.

FIG. 4 illustrates an example of primary valve 11 being opened, pressurized gas supply is transferred from vessel 28 to plurality of expandable structures 13A-13S through plurality of ports 25A-25S respectively. As a result, plurality of expandable structures 13A-13S inflate 15 until met by resistance. In FIG. 4, the resistance is inner wall surface 24 of compartments 5A and 5B and top surfaces of payloads 22A-22C. Further, when expandable structure 13B is expanded 15 until it contacts inner wall surface 24 of compartment 5, it provides a barrier which prevents payload 22A from sliding beyond the outer surface of expandable structure 13B. Expandable structures 13C-13G contact the top portion of payload 22A and secure payload 22A in place 27. Expandable structures 13H-13M contact the top portion of payload 22B and secure payload 22B in place 27. Expandable structures 13N-13Q contact the top portion of payload 22C and secure payload 22C in place 27. Expandable structure 13R is expanded 15 until it contacts inner wall surface 24 of compartment 5 of container 2, it provides a barrier which prevents payload 22C from sliding beyond the outer surface of expandable structure 13R.

Figures 5, 6:
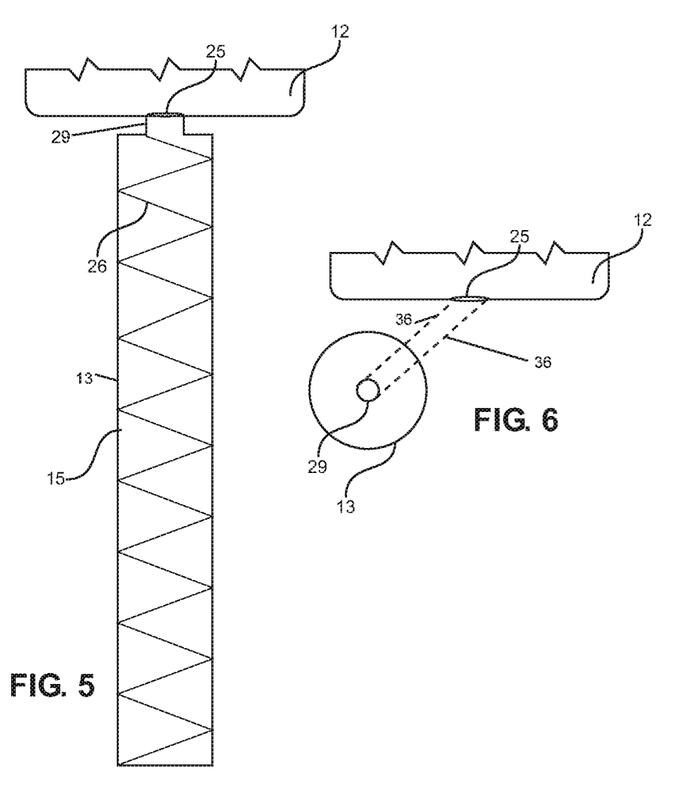
FIG. 5 is a partial side cut-away view of the manifold having a port connected to an end of an expandable structure with a spring oriented in an expanded position.
FIG. 6 is an exploded view of an end portion of an expandable structure configured to connect with a manifold port.
Figure 7:
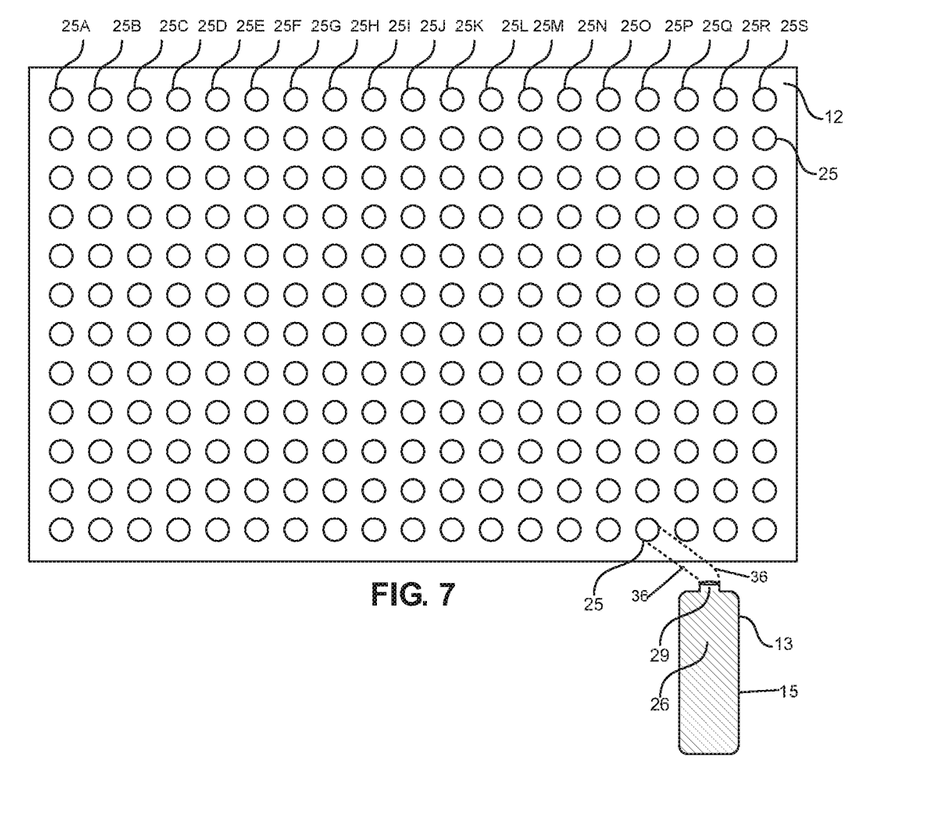
FIG. 7 is a rear view of the manifold having a plurality of ports configured to connect to an end portion of a plurality of expandable structures.

End portion 29 of expandable structure 13 may be in contact with manifold 12, port 25 (FIGS. 2-3, 5, and 7) or both (FIG. 4) manifold 12 and port 25. Plurality of springs 26A-26S are connected to plurality of expandable structures 13A-13S (FIG. 4) respectively. FIGS. 4-5, and 7 show spring 26 is coiled through the entire length of expandable structure 13 to better aide in expansion 15 and retraction of the expandable structure 13.

FIGS. 6-7 depict expandable structure 13 having end portion 29 configured to connect to 36 port 25 of manifold 12. Manifold 12 can have a plurality of ports 25A-25S configured to connect with a plurality of expandable structures 13. Port 25 of manifold 12 can be located in any configuration or arrangement on manifold 12. FIG. 4 illustrates expandable structures 13A-13S each having end portion 29 connected to port 25 and abutting manifold 12. Manifold 12 can have a plurality of ports 25A-25S configured to connect with a plurality of expandable structures 13.

Figure 8:
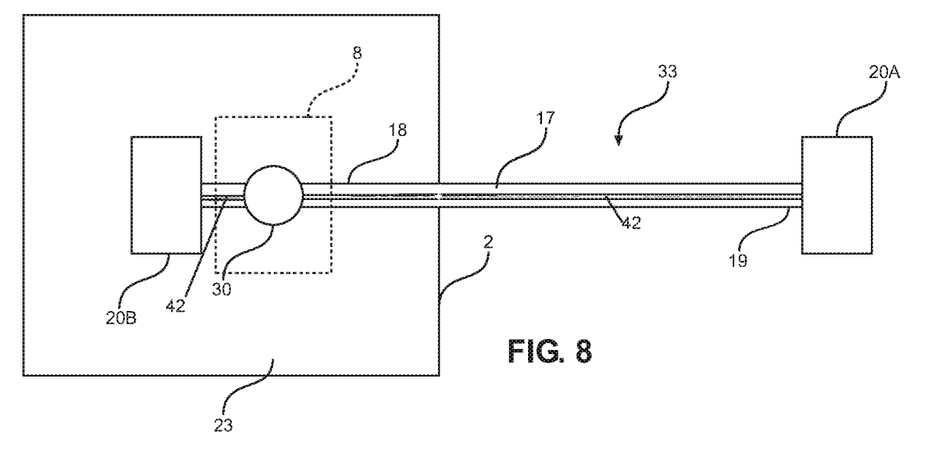
FIG. 8 is a top perspective view of the novel container having an adjustable center of gravity mechanism with an axis of rotation centered on the top surface of the container; and, FIG. 9 is a block diagram of the novel container having a pressurized vessel and a primary valve and a secondary valve in pneumatic communication with a manifold.

FIG. 8 depicts a top view of container 2 having top surface 23. Docking structure 8 is connected to top surface 23 of container 2. Adjustable center of gravity mechanism 33 has axis of rotation 30 of rod 17 positioned at the location of docking structure 8. Docking structure 8 is connected to rod 17. Rod 17 has a primary end 18 located opposite secondary end 19. Rod 17 can be rotatably connected to docking structure 8. Primary end 18 of rod 17 can be connected to track bearing 38 (shown in FIGS. 1-3) including, but not limited to, a roller bearing or a ball bearing 38. Docking structure 8 has ball bearing 38 retained within track 37 (shown in FIGS. 1-3). Ball bearing 38 can slidably traverse track 37 of docking structure 8. Once in a desired position, rod 17 can be locked in place either manually or electronically. In an example, a locking mechanism (not shown) would prevent ball bearing 38 from sliding in track 37 when rod 17 is in a desired position. Weight 20A is connected to secondary end 19 of rod 17 and weight 20B is connected to primary end 18 of rod 17. Weights 20A and 20B can be removable from rod 17. Additional weight 20 may be added or removed from rod 17. Weights 20A and 20B can slidably traverse at least a portion of track 42 (FIG. 8) located on at least a portion of a length of rod 17.

FIG. 9 shows container 2 having docking structure 8. Docking structure 8 has an adjustable center of gravity mechanism 33. Unmanned aerial vehicle 1 connects to docking structure 8. Container 2 has pressurized vessel 28. Pressurized vessel 28 can have pressure regulator 34. When primary valve 11 is opened, pressurized gas from vessel 28 flows through first opening 39 of primary valve 11, flows through second opening 40 of primary valve 11, flows through 43 ports 25 of manifold 12 to plurality of expandable structures 13, causing plurality of expandable structures 13 to inflate and expand 15 until met by resistance from payload 22. Plurality of expandable structures 13 may each have spring 26.

FIG. 9 shows when secondary valve 14 is opened, pressurized gas escapes or is exerted 44 from at least one expandable structure 13. When pressurized gas is exerted from 44 plurality of expandable structures 13, the pressurized gas flows through 44 plurality of ports 25 of manifold 12, flows through second opening 41 of second valve 14, flows through first opening 32 of secondary valve 14, and finally is vented to the atmosphere 45. When the pressurized gas is vented to the atmosphere 45, plurality of expandable structures 13 retract 16. Pressurized vessel 28 can have pressure regulator 34 to step the pressure down 46 (FIG. 9) when in use. Pressure regulator 34 takes a higher pressure and restricts it to a lower pressure to not damage plurality of expandable structures 13 when in use.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A container, comprising:
    at least one compartment, said at least one compartment is configured to conform to at least a portion of a payload;
    a payload;
    said container having a docking structure, said docking structure is configured to communicate with at least a portion of an unmanned aerial vehicle; and,
    said docking structure having a first flange having a first recess located opposite a second flange having a second recess, said first recess and said second recess are configured to engage at least a portion of an unmanned aerial vehicle.

2. The container of claim 1, further comprising:
    said at least one compartment of said container having a plurality of expandable structures, whereby, said plurality of expandable structures are configured to capture at least a portion of said payload.

3. The container of claim 2, further comprising:
    a vessel, said vessel retaining a pressurized gas supply, said plurality of expandable structures are in communication with said pressurized gas supply, whereby, a first valve is positioned in an open configuration to transfer at least a portion of said pressurized gas supply from said vessel to said plurality of expandable structures, thereby, orienting at least a portion of said plurality of expandable structure in an extended position, a second valve is positioned in an open configuration to discharge said at least a portion of said pressurized gas supply from said plurality of expandable structures, thereby, orienting said plurality of expandable structure in a retracted position.

4. The container of claim 3, further comprising:
    said container having a manifold, said manifold having a plurality of ports connected to said plurality of expandable structures, said first valve having a first opening located opposite a second opening, said first opening of said first valve is connected to said vessel, said second opening of said first valve is pneumatically connected to said manifold, said second valve having a first opening located opposite a second opening, said first opening of said second valve is open to the atmosphere, said second opening of said second valve is pneumatically connected to said manifold.

5. The container of claim 2, further comprising:
said plurality of expandable structures having a spring, said spring is configured to bias said plurality of expandable structures when said plurality of expandable structures are oriented in an extended position.

6. The container of claim 1, further comprising:
said container having a rod, said rod having a first end located opposite a second end, said first end of said rod is rotatably connected to said container.

7. The container of claim 6, further comprising:
said second end of said rod protrudes from an outer perimeter edge of said container.

8. The container of claim 7, further comprising:
said second end of said rod is connected to a weight.

9. A container, comprising:
at least one compartment, said at least one compartment is configured to conform to at least a portion of a payload;
a payload;
said container having a docking structure, said docking structure is configured to communicate with at least a portion of an unmanned aerial vehicle; and,
said docking structure of said container having a rod, said rod having a first end located opposite a second end, said first end of said rod is connected to said docking structure of said container, said second end of said rod is connected to a weight.

10. The container of claim 9, further comprising:
said at least one compartment of said container having a plurality of expandable structures, whereby, said plurality of expandable structures are configured to capture at least a portion of said payload.

11. The container of claim 10, further comprising:
a vessel, said vessel retaining a pressurized gas supply, said plurality of expandable structures are in communication with said pressurized gas supply, whereby, a first valve is positioned in an open configuration to transfer at least a portion of said pressurized gas supply from said vessel to said plurality of expandable structures, thereby, orienting at least a portion of said plurality of expandable structure in an extended position, a second valve is positioned in an open configuration to discharge said at least a portion of said pressurized gas supply from said plurality of expandable structures, thereby, orienting said plurality of expandable structure in a retracted position.

12. The container of claim 11, further comprising:
said container having a manifold, said manifold having a plurality of ports connected to said plurality of expandable structures, said first valve having a first opening located opposite a second opening, said first opening of said first valve is connected to said vessel, said second opening of said first valve is pneumatically connected to said manifold, said second valve having a first opening located opposite a second opening, said first opening of said second valve is open to the atmosphere, said second opening of said second valve is pneumatically connected to said manifold.

13. The container of claim 10, further comprising:
said plurality of expandable structures having a spring, said spring is configured to bias said plurality of expandable structures when said plurality of expandable structures are oriented in an extended position.

14. The container of claim 9, further comprising:
said weight can slidably traverse at least a portion of said length of said rod.

15. A container, comprising:
at least one compartment, said at least one compartment is configured to conform to at least a portion of a payload;
a payload;
said container having a docking structure, said docking structure is configured to communicate with at least a portion of an unmanned aerial vehicle; and,
said docking structure of said container having a rod, said rod having a first end located opposite a second end, said rod is rotatably connected to said docking structure of said container, said second end of said rod is connected to a weight.

16. The container of claim 15, further comprising:
said at least one compartment of said container having a plurality of expandable structures, whereby, said plurality of expandable structures are configured to capture at least a portion of said payload.

17. The container of claim 16, further comprising:
a vessel, said vessel retaining a pressurized gas supply, said plurality of expandable structures are in communication with said pressurized gas supply, whereby, a first valve is positioned in an open configuration to transfer at least a portion of said pressurized gas supply from said vessel to said plurality of expandable structures, thereby, orienting at least a portion of said plurality of expandable structure in an extended position, a second valve is positioned in an open configuration to discharge said at least a portion of said pressurized gas supply from said plurality of expandable structures, thereby, orienting said plurality of expandable structure in a retracted position.

18. The container of claim 17, further comprising:
said container having a manifold, said manifold having a plurality of ports connected to said plurality of expandable structures, said first valve having a first opening located opposite a second opening, said first opening of said first valve is connected to said vessel, said second opening of said first valve is pneumatically connected to said manifold, said second valve having a first opening located opposite a second opening, said first opening of said second valve is open to the atmosphere, said second opening of said second valve is pneumatically connected to said manifold.

19. The container of claim 16, further comprising:
said plurality of expandable structures having a spring, said spring is configured to bias said plurality of expandable structures when said plurality of expandable structures are oriented in an extended position.

20. The container of claim 15, further comprising:
said first end of said rod having a weight connected thereto.

21. The container of claim 15, further comprising:
said second end of said rod protrudes from an outer perimeter edge of said container.

22. A container, comprising:
at least one compartment, said at least one compartment is configured to conform to at least a portion of a payload, said at least one compartment of said container having a plurality of expandable structures, said plurality of expandable structures are configured to capture said at least a portion of said payload; and, a docking structure, said docking structure is configured to communicate with at least a portion of an unmanned aerial vehicle, said docking structure having a first flange having a first recess located opposite a second flange having a second recess, said first recess and said second recess are configured to engage at least a portion of an unmanned aerial vehicle.

23. The container of claim 22, further comprising:
a vessel, said vessel retaining a pressurized gas supply, said plurality of expandable structures are in communication with said pressurized gas supply, a first valve is positioned in an open configuration to transfer at least a portion of said pressurized gas supply from said vessel to said plurality of expandable structures, thereby, orienting at least a portion of said plurality of expandable structure in an extended position, a second valve is positioned in an open configuration to discharge said at least a portion of said pressurized gas supply from said plurality of expandable structures, thereby, orienting said plurality of expandable structure in a retracted position.

24. The container of claim 22, further comprising:
said container having a manifold, said manifold having a plurality of ports connected to said plurality of expandable structures, said first valve having a first opening located opposite a second opening, said first opening of said first valve is connected to said vessel, said second opening of said first valve is pneumatically connected to said manifold, said second valve having a first opening located opposite a second opening, said first opening of said second valve is open to the atmosphere, said second opening of said second valve is pneumatically connected to said manifold.

25. The container of claim 22, further comprising:
said plurality of expandable structures having a spring, said spring is configured to bias said plurality of expandable structures when said plurality of expandable structures are oriented in an extended position.

26. A container, comprising:
at least one compartment, said at least one compartment is configured to conform to at least a portion of a payload, said at least one compartment of said container having a plurality of expandable structures, said plurality of expandable structures are configured to capture said at least a portion of said payload; and,
a docking structure, said docking structure is configured to communicate with at least a portion of an unmanned aerial vehicle, said docking structure of said container having a rod, said rod having a first end located opposite a second end, said first end of said rod is connected to said docking structure of said container, said second end of said rod is connected to a weight.

27. The container of claim 26, further comprising:
a vessel, said vessel retaining a pressurized gas supply, said plurality of expandable structures are in communication with said pressurized gas supply, a first valve is positioned in an open configuration to transfer at least a portion of said pressurized gas supply from said vessel to said plurality of expandable structures, thereby, orienting at least a portion of said plurality of expandable structure in an extended position, a second valve is positioned in an open configuration to discharge said at least a portion of said pressurized gas supply from said plurality of expandable structures, thereby, orienting said plurality of expandable structure in a retracted position.

28. The container of claim 26, further comprising:
said container having a manifold, said manifold having a plurality of ports connected to said plurality of expandable structures, said first valve having a first opening located opposite a second opening, said first opening of said first valve is connected to said vessel, said second opening of said first valve is pneumatically connected to said manifold, said second valve having a first opening located opposite a second opening, said first opening of said second valve is open to the atmosphere, said second opening of said second valve is pneumatically connected to said manifold.

29. The container of claim 26, further comprising:
said plurality of expandable structures having a spring, said spring is configured to bias said plurality of expandable structures when said plurality of expandable structures are oriented in an extended position.

30. A container, comprising:
at least one compartment, said at least one compartment is configured to conform to at least a portion of a payload, said at least one compartment of said container having a plurality of expandable structures, said plurality of expandable structures are configured to capture said at least a portion of said payload; and,
a docking structure, said docking structure is configured to communicate with at least a portion of an unmanned aerial vehicle, said docking structure of said container having a rod, said rod having a first end located opposite a second end, said rod is rotatably connected to said docking structure of said container, said second end of said rod is connected to a weight.

31. The container of claim 30, further comprising:
said first end of said rod having a weight connected thereto.

32. The container of claim 30, further comprising:
said second end of said rod protrudes from an outer perimeter edge of said container.

33. The container of claim 31, further comprising:
said weight can slidably traverse at least a portion of said length of said rod.

* * * * *